Patented Mar. 14, 1933

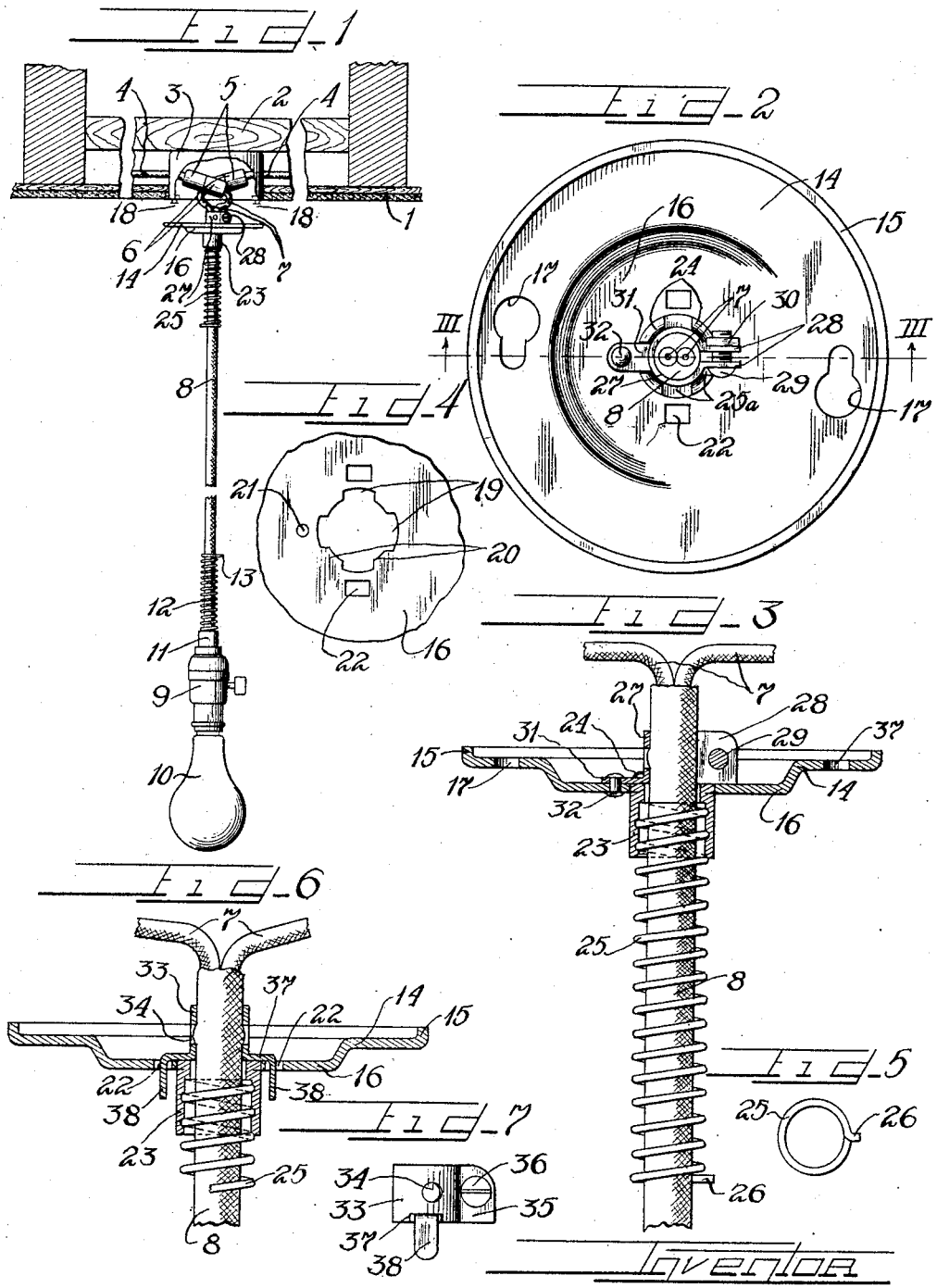

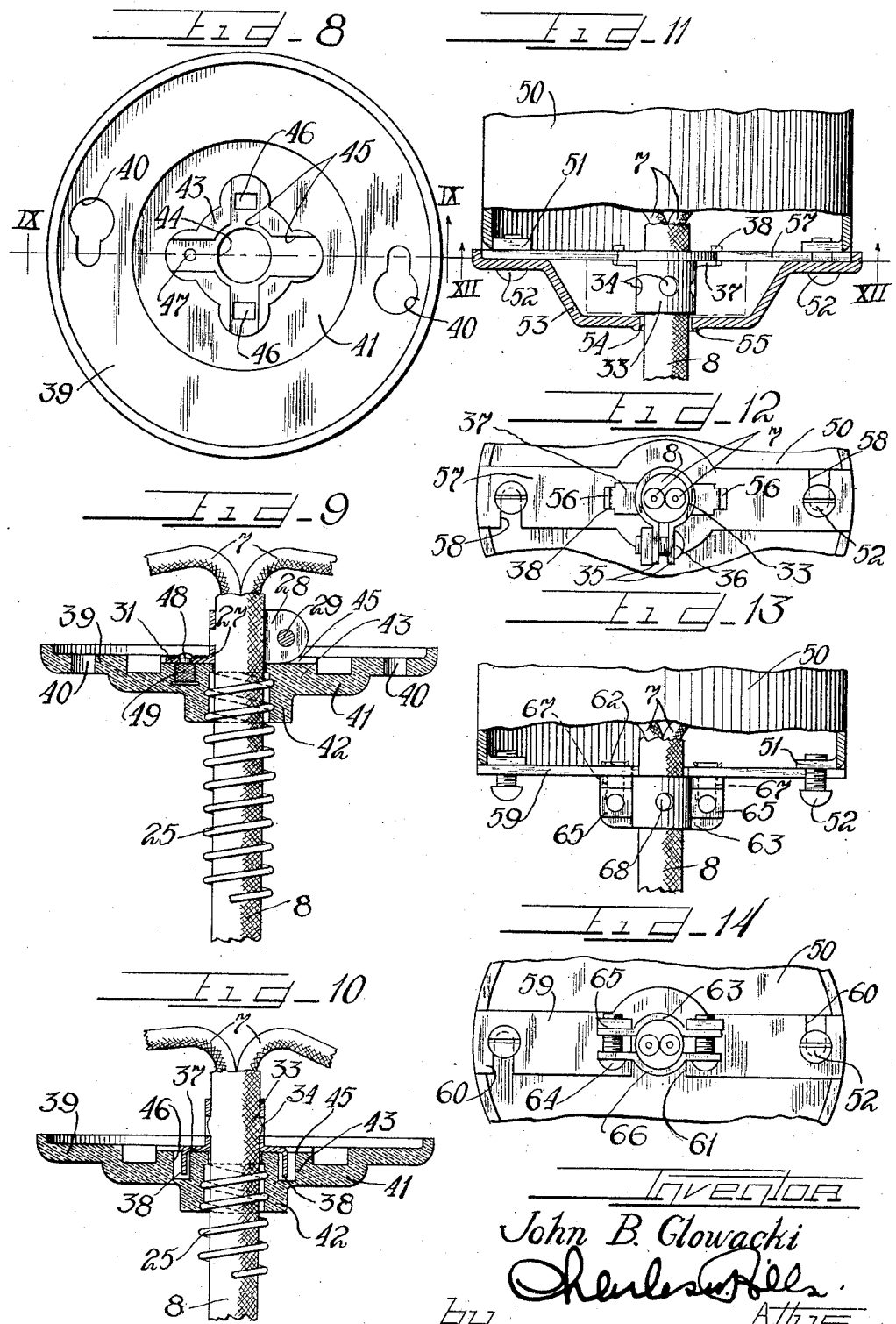

1,901,232

UNITED STATES PATENT OFFICE

JOHN B. GLOWACKI, OF CHICAGO, ILLINOIS

DROP CORD PROTECTOR

Application filed November 29, 1929. Serial No. 410,541.

In the past, with the use of drop cords extending through the cover plate of ceiling outlet boxes, considerable difficulties have been encountered in that the drop cords, where they project through the openings in the outlet box cover plate, are subjected to rubbing and pulling strains which soon wear through the covering of the wires in the cords, thereby making it necessary to replace the drop cords to obviate any danger of short-circuits, fires or other mishaps.

To do away with the danger of wearing out of drop cords where they project through outlet box covers, this invention has been devised to provide an improved type of drop cord protector adapted to be associated with the outlet box cover and with that portion of the drop cord immediately inside of the cover to relieve the drop cord of undue stresses and strains and obviating any material wear of the cord where it projects through the outlet box cover.

It is an object of this invention to provide a protector for a drop cord, said protector adapted to be engaged on the cord before the outlet box cover plate is secured in place and is arranged to afford sufficient slack in the wire connections inside of the outlet box to relieve the same of stresses and strains which might be applied to the projecting portion of the drop cord.

It is also an object of this invention to provide a drop cord protector adapted to be clamped on the drop cord inside of an outlet box before the outlet box cover is secured in place, thereby relieving the cord connections in the outlet box from strains and permitting the cord to project through the cover and through a guard spring associated therewith to obviate undue wearing strains being applied to the drop cord where it projects through the outlet box cover.

It is a further object of this invention to provide a drop cord protector adapted to be clamped to the drop cord inside of an outlet box to relieve strains on the connections in the outlet box, with said protector adapted to be associated with the cover of the outlet box or with a bridge piece held in position by said cover to hold the drop cord against rotational or twisting movement with respect to the outlet ferrule of the outlet box cover to reduce strains and wear on the drop cord.

It is furthermore an object of this invention to provide an improved protector for drop cords and the like, with said protector adapted to be clamped in position on the drop cord adjacent the points where the drop cord wires are connected with the wires of an outlet box, said protector being associated with the outlet box cover or with a bridge piece therein, so that there is no relative rotational or twisting movement of the protector with respect to the cover, thereby affording an arrangement wherein the cord is protected against undue wear or strains where it projects outwardly through the outlet box cover.

Still another object of the invention is to equip a drop cord with a protector which is associated with the outlet box cover to hold the protector against rotation with respect thereto and also holding the drop cord against twisting or rotational movement where it passes through the outlet box cover and through the guard spring associated therewith for the purpose of preventing sharp bending of the drop cord where it projects downwardly through the outlet box cover.

It is an important object of this invention to provide a drop cord protector of a simplified and inexpensive type adapted to be associated with an outlet box cover and furthermore adapted to be clamped on the upper portion of the drop cord inside of the cover before the cover is secured in place, to afford sufficient slack in the connections within the outlet box and furthermore affording an arrangement whereby twisting and wearing strains are materially reduced on that portion of the drop cord which extends through the outlet box cover and through a guard spring carried thereby.

Other and further important objects of this invention will be apparent from the disclosures in the specification and the accompanying drawings.

The invention (in a preferred form) is illustrated in the drawings and hereinafter more fully described.

On the drawings:

Figure 1 illustrates a fragmentary sectional view of a ceiling having an outlet box mounted therein, from which is suspended a drop cord having engaged thereon and associated with the outlet box cover an improved drop cord protector embodying the principles of this invention.

Figure 2 is an enlarged inside plan view of the outlet box cover illustrating the mounting and positioning of the drop cord protector and its association with a grooved or notched ferrule connected in the opening of the cover.

Figure 3 is a sectional view of the device taken on line III—III of Figure 2 with parts shown in elevation.

Figure 4 is a fragmentary interior view of the middle portion of the outlet box cover prior to the insertion of the ferrule and illustrating the openings required in said cover for the reception of the ferrule and for a preferred and modified form of protector.

Figure 5 is an outer end view of the protector guard spring.

Figure 6 is a sectional view of an outlet box cover similar to that illustrated in Figure 3 but showing a modified form of drop cord protector.

Figure 7 is a side elevation of a modified form of drop cord protector of the type illustrated in Figure 6.

Figure 8 is an interior plan view of the modified form of outlet box cover having the interior central portion of the plate apertured and grooved to permit mounting of either of the types of drop cord protector illustrated in Figures 3 and 6.

Figure 9 is a sectional view of the modified form of outlet box cover taken on line IX—IX of Figure 8 and illustrating a fragmentary portion of the drop cord with the type of protector illustrated in Figure 3 associated therewith.

Figure 10 is a fragmentary sectional view similar to that illustrated in Figure 9, showing the drop cord having the modified form of protector of the type illustrated in Figure 6 associated therewith and with the modified form of outlet box cover.

Figure 11 illustrates a fragmentary view of an outlet box and its cover, with parts broken away to show the interior construction and with the drop cord associated with a modified form of protector and a protector supporting bridge member.

Figure 12 is a fragmentary bottom plan view of the connector and supporting bridge bar of the modified type illustrated in Figure 11, with said view taken on line XII—XII of said figure.

Figure 13 is a fragmentary side elevation of another form of outlet box with the cover omitted and with parts broken away to illustrate another modified form of drop cord protector associated with a modified form of bridge plate or bar adapted to be held in position inside of the outlet box cover.

Figure 14 is a fragmentary bottom plan view of the modified form of arrangement illustrated in Figure 13.

As shown on the drawings:

The reference numeral 1 indicates a fragmentary portion of a ceiling construction having a crossbar or support 2 forming a part thereof, to which an outlet box 3 is secured by any standard means. Leading into the outlet box 3 through openings in the walls thereof are two electric light conductors or wires 4 having engaged on the ends thereof within the outlet box connector sections or members 5 adapted to have removably engaged therein connector sections or members 6. The connector sections 6 are secured to the ends of the electric light connectors or wires 7 which form a part of a drop cord 8 of any desired type or construction. Connected to the wires at the lower end of the drop cord 8 is an electric light socket 9 which has removably engaged therein an electric light bulb 10. Secured in the upper end of the electric light socket 9 is an internally threaded sleeve or ferrule 11 having one end of an auxiliary guard coiled spring 12 threaded therein and engaged around the lower end of the drop cord where it connects up with the electric light socket 9. The guard spring 12 is of the coiled type and has the upper end thereof bent outwardly at right angles out of the path of the uppermost convolution of said spring to form a finger or projection 13. The sleeve 11 and the guard spring 12 form a protector for the lower portion of the drop cord where it enters the electric light socket 9 so that the drop cord at the lower portion thereof cannot be abruptly bent or deflected to cause wear or injury thereto.

Before the connector sections 6 are engaged on the upper ends of the wires forming part of the drop cord 8, an outlet box cover 14 is slidably engaged on the drop cord.

The outlet box cover 14 is provided with a peripheral, upwardly directed flange 15 and with a depressed middle portion or cup-shaped pocket 16. The main plate or section of the outlet box cover 14 is provided with a pair of diametrically opposite T-slots or openings 17 adapted to facilitate mounting of the cover plate on supporting screws 18 which are carried by lugs which are integrally formed in the outlet box.

Referring to the detailed showing of the middle portion of the outlet box cover illustrated in Figure 4, the middle portion of the plate forming part of the pocket or cup 16 is provided with a central opening of irregular shape, consisting of a plurality of oppositely positioned notches 19 which are separated by a plurality of oppositely positioned projections or teeth 20. Also provided in the cover plate cup 16 to the outside of one of the notches 19 is an opening or aperture 21. Also provided in the outlet box cover cup member 16 are two oppositely positioned apertures or openings 22 which are positioned to the outside and in alignment with two of the notches 19 forming part of the central opening in the plate 16.

Forced through the central opening in the outlet box cover cup section 16 is one end of a metal sleeve or ferrule 23. The inner end of the ferrule or sleeve 23 projects beyond the inner surface of the cup section 16 of the cover plate and has four segment sections thereof adjacent the notches 19 upset or swaged to fill the notches 19 and leave four spaced projections or teeth 24 separated by recesses at 25a to afford two pairs of oppositely positioned grooves for the reception of drop cord protectors hereinafter described in detail. The swaging over of parts of the inner end of the ferrule or sleeve 23 serves to rigidly hold the ferrule in place against rotation and affords a passage through which the drop cord 8 is adapted to be inserted through the plate. The interior of the outer or lower end of the ferrule or sleeve 23 is internally threaded to permit the upper end of a coiled guard or protecting spring 25 to be threaded into the ferrule as clearly illustrated in Figure 3. The guard or protecting spring 25 is of the coiled type and is engaged around the drop cord 8 to prevent abrupt bending or turning of the cord immediately below the sleeve or ferrule 23. The lower end of the guard spring 25 has the tip thereof bent outwardly at right angles to afford a finger or projection 26, affording an arrangement wherein there is no danger of the end of the spring getting caught in the drop cord covering. The improved protector device forming part of the drop cord protecting mechanism is in the form of a metal clamp comprising an apertured split sleeve 27, the margins of which have integrally formed thereon outwardly projecting apertured flanges or wings 28 through which a screw clamping bolt 29 projects and threads through a square nut 30, one edge of which contacts the side of the sleeve 27 to hold the nut 30 against rotation as the screw member 29 is threaded through the flanges 28 to cause the split sleeve 27 to be tightly clamped around the drop cord 8, permitting portions of the covering of the drop cord to expand or project into the apertures provided in the clamping sleeve 27 to rigidly hold the protector device engaged on the drop cord. Integrally formed radially on the bottom edge of the clamping sleeve 27 opposite the two flanges or wings 28 is a tongue or arm 31 having an aperture therein through which a rivet 32 is adapted to be engaged, with said rivet projecting through the opening 21 in the cup 16 of the outlet box cover plate to rigidly hold the protector secured within the cover plate cup 16, as clearly illustrated in Figure 3. The tongue member 31 and the flanges 28 forming part of the protector are so positioned that they seat in two oppositely positioned grooves or notches 5 provided in the inner end of the ferrule 23, thus affording an arrangement whereby the protector is held against rotation with respect to the cover plate.

In the form of the drop cord protector illustrated in Figures 1 to 5, inclusive, the mounting of the device is comparatively simple. The drop cord 8 which is to be protected may have the electric light socket 9 and the spring guard 12 engaged thereon, as illustrated in Figure 1, in which case the upper or second end of the drop cord is engaged through the upper guard spring 25 and through the outlet box cover and the protector sleeve 27 engaged on the inner face of the cover. The two wires at the upper end of the cord are then separated and the connector sections 6 are engaged thereon to permit the drop cord to be connected with two of the connector section 5 attached to the ends of the feed wires 4 which project into the outlet box 3. After the ends of the wires 7 of the drop cord have been connected with the wires 4 by means of the connectors 5—6, the outlet box cover 14 is slidably pushed upwardly on the drop cord until the protector sleeve 27 is within a short distance of the connectors 5—6 and until the outlet box cover is spaced only a short distance below the outlet box 3 sufficient to permit a screw-driver to be engaged between the cover and the box to permit the screw 29 of the protector to be tightened to rigidly clamp the protector on the drop cord. With the protector clamped on the drop cord, the outlet box 14 is pushed upwardly, permitting the enlarged portions of the T-slots 17 to be engaged over the supporting screws 18, after which the cover is slightly twisted to permit the restricted part of the T-slots 17 to engage on the stems of the screw members 18, permitting the screws 18 to be tightened to rigidly hold the outlet box cover secured against the bottom of the outlet box with the flange 15 projecting over the lower margin of the wall of the outlet box. It will thus be noted that the drop cord is clamped in the protector sleeve 27 and is held against rotation, due to the fact that parts of the cord covering project into the opening of the sleeve 27 and because the protector is secured to the inner face of the outlet box cover by means of the rivets 32 and due to the fact that the flanges 28 and the tongue 31 of the protector are seated in two oppositely positioned recesses or grooves 25ª formed in the inner end of the sleeve or ferrule 23 which is secured to the outlet box cover. Twisting and frictional strains on the drop cord where it projects through the outlet box cover are thus obviated by the improved protector, and the protector coiled spring 25 threaded into the ferrule 23 acts as an additional means for preventing the upper portion of the drop cord from being abruptly bent or twisted, so that the same is protected and is not permitted to come into direct contact with the lower edge of the ferrule or sleeve 23.

Figures 6 and 7 illustrate a modified form of drop cord protector adapted to be used in combination with the outlet box cover 14 and particularly with the apertures 22 formed in the cup portion 16 of the outlet box cover. In Figure 6, the parts which are the same as those described in connection with Figures 1 to 5, inclusive, are designated by the same reference numerals.

The modified form of protector comprises a split sleeve or collar 33 having a plurality of openings 34 therein. Integrally formed on the margins of the split portion of the sleeve or ring 33 are a pair of wings or flanges 35 having openings therethrough for the reception of a clamping screw-bolt 36. Integrally formed on opposite sides of the sleeve or split ring 33 are a pair of radially directed arms 37, the ends of which are reduced in width to afford retaining fingers or lugs 38 which are bent downwardly at right angles to the arms 37, as clearly illustrated in Figure 6, to permit the fingers to project through the openings 22 in the cup portion 16 of the outlet box cover or plate 14.

In this form of the device, the outlet box cover and the guard spring 25 attached thereto are slidably engaged on the drop cord 8 beneath the protector, after which the wires 7 leading from the upper end of the cord are equipped with the connector sections 6 to permit the wires to be connected to the feed wires 4 in the outlet box. The protector is now pushed upwardly to within a short distance of the connectors 5—6, and the clamping screw bolt 36 is tightened to rigidly clamp the protector sleeve 33 on the drop cord, permitting portions of the covering of said drop cord to project into the apertures 34 to hold the protector against rotation with respect to the drop card. With the protector clamped on the upper portion of the drop cord, the outlet box cover is now slidably moved upwardly on the drop cord until the large portions of the T-slots 17 are inserted over the heads of the mounting screws 18. The cover is now slightly rotated to engage the restricted parts of the T-slots 17 on the stems or shanks of the screws 18, after which the screws 18 are tightened to rigidly held the cover in place on the outlet box 3. In moving the outlet box cover in position to close the outlet box, the fingers 38, forming part of the protector, are permitted to project through the apertures 22 of the cover, so that the arms 37 are permitted to seat in two of the recesses or guide slots 25a provided in the inner end of the ferrule or sleeve 23, so that the protector is held against rotation and positively positioned with respect to the outlet box cover. The improved protector, when clamped in position as illustrated in Figure 6, is held against rotation when the outlet box cover is engaged therewith, so that twisting of the supported end of the drop cord is prevented. The guard spring 25, carried by the ferrule of the cover plate, serves as a means for preventing sharp twisting or bending of the drop cord below the lower end of the ferrule or sleeve 23, so that the cord is further protected against undue wear and strains. When the outlet box cover is raised into coacting relation with the protector on the drop cord, the wires within the outlet box are slightly raised to afford sufficient slack so that no strains are put on the connections between the wires 7 of the drop cord and the feed wires 4 extending into the outlet box.

Figures 8 and 9 illustrate a modified form of outlet box cover having associated therewith a drop cord protector of either of the types illustrated in Figures 3 and 6. The modified form of outlet box cover is of unitary construction and comprises a peripherally flanged plate 39 provided with a pair of diagonally opposite T-slots or openings 40. The middle portion of the cover plate is depressed or formed to provide a cup or pocket 41 having integrally formed on the outer surface and centrally thereon a ferrule or sleeve 42 which is internally threaded for the reception of one end of the drop cord protector guard spring 25. Integrally formed on the inner side of the middle portion of the outlet box cover cup 41 is a boss 43 which is provided with a central opening 44 which which communicates with the opening in the sleeve or ferrule 42 to permit the drop cord 8 to be projected upwardly through the cover. The boss portion 43 of the cover is provided with a plurality of radially directed grooves or guide slots 45 positioned at right angles with respect to one another. Provided in two of the grooves or slots 45 are two oppositely positioned openings or apertures 46. Provided in one of the slots or grooves 45 between the two slots in which the apertures 46 are provided is an opening 47 for the reception of a retaining rivet 48 which projects through the opening in the arm or finger 31 of the protector to hold the protector of the type illustrated in Figure 3 secured within the modified form of outlet box cover plate 39. As illustrated in Figure 9, the retaining rivet 48 is provided with a knurled base 49 which is rigidly cast in the cover pocket 41 of the cover which is constructed of composition insulation material.

When the type of protector illustrated in Figure 9 is used in combination with the modified form of outlet box cover, the flanges or wing members 28 of the protector are adapted to seat in one of the grooves 45 while the arm or finger 31 is adapted to seat in the opposite groove to permit the retaining rivet 48 to hold the protector rigidly connected with the cover. When the connections between the wires 7 of the drop cord are made with the wires 4 in an outlet box, the cover 39 is moved upwardly on the drop cord to within a short distance of the bottom of the outlet box to permit a screw driver to be engaged between the cover and box so that the clamping screw-bolt 29 may be tightened to cause the sleeve of the protector to be clamped on the drop cord with parts of the drop cord covering projecting into the apertures provided in the protector sleeve 27. With the protector clamped on the drop cord, the cover 39 is adapted to be raised into engagement with the retaining screws 18 of the outlet box so that the cover may be secured in place with the protector clamped on the drop cord to hold the same against twisting or rotational movement, so that wear on the drop cord is greatly reduced. The portion of the drop cord projecting through the sleeve 42 is protected against sharp bending or twisting by the guard spring 25 which is threaded into the sleeve 42.

Figure 10 illustrates the same modified form of outlet box cover which is illustrated and described in connection with Figures 8 and 9, but, in this figure, the modified type of protector illustrated in Figure 7 is associated with the cover, with the fingers or projections 38 of the protector engaged in the apertures 46. In this combination of the device, the protector sleeve 33 is moved upwardly on the drop cord to within a short distance of the connectors within the outlet box, and the clamping screw is tightened to cause the sleeve 33 to be clamped in position on the drop cord. The cover 39 is now adapted to be moved upwardly on the drop cord, permitting the fingers or projections 38 to project into the openings 46 in the cover and permitting the arms 37 to seat in the grooves in which the openings 46 are provided. This arrangement permits the protector to be held against rotation by the cover which is secured in place by means of the retaining screws 18 forming part of the outlet box 3.

Figures 11 and 12 illustrate an outlet box and cover having associated therewith a support for a drop cord protector of the type illustrated in Figure 7. In this form of the device, the reference numeral 50 indicates an outlet box provided with a pair of oppositely positioned projections or lugs 51 which are provided with threaded openings for the reception of cover supporting screws 52. The outlet box 50 is provided with a flanged, cup-shaped cover 53 provided with a central opening 54 to permit the cover to be slidably engaged over a drop cord 8, the two wires 7 of which have the upper ends thereof connected by means of connectors or other suitable means to electric feed wires projecting into the outlet box 50. A rounded bead 55 is integrally formed on the margin of the opening 54 to afford a smooth, rounded surface to prevent injury to the covering of the drop cord 8.

The drop cord protector of the type illustrated in Figure 7 is adapted to be engaged on the drop cord above the cover 53 and has the fingers or projections 38 thereof projected upwardly through a pair of openings 56 which are provided in a bridge bar or crosspiece 57 provided with a middle opening to permit the crosspiece to be slidably engaged on the drop cord 8. The bridge bar 57 is provided with a pair of oppositely directed notches 58 positioned near the ends of opposite sides of the bridge bar to permit the bridge bar to be engaged on the stems of the supporting screws 52. The ends of the finger pieces of the protector are projected through the openings 56 of the bridge bar and are bent over as indicated in Figure 11 to rigidly hold the protector secured to the under surface of the bridge bar 57. With the protector and bridge bar connected as described, the bridge bar is moved upwardly on the drop cord 8 to within a short distance of the upper end of the drop cord, after which the clamping screw 36 of the protector is tightened to cause the protector sleeve or collar 33 to be clamped on the drop cord with portions of the covering of the drop cord seating or projecting into the apertures 34 to hold the protector against rotation on the drop cord. With the protector clamped on the drop cord, the bridge bar 57 is raised upwardly adjacent the screw members 52 and is slightly rotated to permit the notches 58 in the bridge bar to engage the stems of the screws, after which the cover 53 is moved upwardly to close the bottom end of the outlet box 50 with the heads of the screws engaged in T-slots provided in the cover similar to the arrangement illustrated in Figure 8. The screws 52 are now tightened to rigidly hold the bridge bar 57 and the cover 53 in position. By mounting the protector on the bridge bar and then raising the bridge bar into position, the connecting wires forming part of the drop cord are provided with sufficient slack to relieve the connections in the outlet box 50 from tensional strains and stresses, since the drop cord is supported in position by means of the apertured sleeve 33 forming part of the protector.

Figures 13 and 14 illustrate an outlet box having associated therewith a modified form of bridge piece and a drop cord protector adapted to be supported thereon. In this form of the device the outlet box is similar to that illustrated and described in connection with Figures 11 and 12 and similar reference numerals are used to indicate like parts. In this form of the device, a bridge bar or crosspiece 59 is provided having a pair of oppositely directed notches 60 provided in the sides diagonally opposite one another, as illustrated in Figure 14. A notch or opening 61 is provided in the middle portion of one side of the bridge bar 59. The bridge bar 59 is also provided with a pair of openings on opposite sides of the rear end of the large notch 61 to permit a pair of lugs or projections 62 to be projected through the bridge bar. The projections 62 are integrally formed on one edge of a protector plate or yoke bar 63, the middle portion of which is rounded to permit the same to seat against the curved surface of a drop cord 8, while the ends are provided with a pair of openings for the reception of a pair of clamping screw-bolts 64 having squared nuts 65 which are adapted to be held against rotation by having flat contact with the corners formed in the protector member 63. The projections or lugs 62 formed on the protector section or yoke bar 63 are swaged or upset against the top face of the bridge bar 59 to rigidly hold the protector yoke section secured to said bridge bar. Adapted to be associated with the protector yoke bar or section 63 is a movable protector yoke bar or section 66 having a rounded middle portion and flanged ends, said flanged ends being provided with apertures to permit the clamping screws 64 to be projected therethrough. The openings in the flanges of the protector yoke member 66 are in the form of notches opening through the upper margin of said flanges, as indicated in dotted lines in Figure 13, with said notches being designated by the reference numeral 67. The curved middle portions of each of the protector yoke bars 63 and 66 are provided with an aperture or opening 68.

In the form of the protector illustrated in Figures 13 and 14, the protector yoke member 63, being rigidly secured to the bridge bar 59, is engaged around one side of the drop cord 8 a short distance below the outlet box 50, and the second half of the protector, in the form of the yoke bar 66, is engaged on the opposite side of the drop cord and is pushed upwardly, permitting the notches 67 thereof to be engaged over the threaded shank portions of the clamping screws 64. The clamping screws 64 are now tightened to clamp the two yoke members comprising the protector tightly around the drop cord, with portions of the covering of the drop cord projecting into the aperture 68 to rigidly hold the drop cord against rotation within the protector. With the protector clamped on the drop cord, the bridge bar is now raised and engaged on the supporting screws 52 of the outlet box, after which the cover of the outlet box is moved into position to engage the screws 52 which are tightened to rigidly hold the bridge bar 59 and the cover secured in place on the outlet box 50.

By securing the protector to the drop cord before the bridge plate 59 is mounted in position, there is sufficient slack left in the wires 7, connected with the wires in the outlet box 50, so that no strains or stresses will be applied to the sections of these wires where they are joined together by means of connectors or other suitable means. With the protector clamped on the drop cord 8, the drop cord is held against rotation with respect to the connector and is permitted to pass through the opening in the outlet box cover similar to the arrangement illustrated in Figure 11.

Attention is called to the fact that the various types of drop cord protectors hereinbefore described are adapted to be associated with the covers of outlet boxes or with bridge pieces adapted to be enclosed in the outlet boxes and held in place by means of the outlet box covers. The outlet box covers and the bridge pieces are constructed to receive portions of the drop cord protectors to hold the protectors against rotation with respect to the outlet box covers or the bridge bars, so that, when the protectors are clamped on drop cords, there is no relative rotational movement of the drop cord with respect to the protectors, the outlet box covers or the bridge bars. The apertures provided in the various sleeves or sections comprising the protectors afford another means to facilitate clamping of the protectors on drop cords with portions of the drop cords adapted to be projected into the openings to assist in holding the protectors against rotation with respect to the drop cords.

The various types of drop cord protectors hereinbefore described thus afford a convenient protection for drop cords where they project through outlet box covers and furthermore provide a means for obviating twisting of the drop cords with respect to the covers so that no wear is inflicted upon the drop cords and no stresses or strains are apt to be conveyed to the drop cord wires where they are connected up with the power wires or lead wires in the outlet boxes.

It will, of course, be understood that numerous details of construction may be varied through a wide range without departing from the principles of this invention, and it is, therefore, not purposed to limit the patent granted hereon otherwise than necessitated by the scope of the appended claims.

I claim as my invention:

1. The combination with an outlet box cover and a drop cord projecting therethrough, of a protector for said drop cord comprising an apertured split member, apertured projections integrally formed thereon, a clamping member projecting through said apertured projections to permit the apertured split member to be clamped on the drop cord, and means on said apertured member coacting with the cover to hold the protector against rotation with respect to said cover.

2. The combination with an outlet box fitting and a drop cord projecting therethrough, of a protector for said drop cord comprising an apertured member engaged around the drop cord, means for clamping the same on said drop cord, and means on said apertured member and coacting with the fitting to hold the protector against rotation to obviate rotation and twisting of the drop cord with respect to said fitting.

3. The combination with an outlet box cover and a drop cord projecting therethrough, of a protector for said drop cord comprising an apertured split member, a screw-bolt for clamping the same around the drop cord, and means integrally formed on said apertured split member having coacting engagement with the outlet box cover to hold the protector against rotation to obviate turning and twisting of the drop cord with respect to said cover.

In testimony whereof I have hereunto subscribed my name at Chicago, Cook County, Illinois.

JOHN B. GLOWACKI.